United States Patent

[11] 3,542,400

| [72] | Inventor | Wylie A. Mason, Jr. |
| --- | --- | --- |
| | | Thousand Oaks, California |
| [21] | Appl. No. | 731,908 |
| [22] | Filed | May 24, 1968 |
| [45] | Patented | Nov. 24, 1970 |
| [73] | Assignee | Wells Industries Corporation |
| | | Hollywood, California |
| | | a corporation of California |

[54] UNIVERSAL TRAILER COUPLING
5 Claims, 4 Drawing Figs.

[52] U.S. Cl. .................................................. 280/492,
280/511, 280/515
[51] Int. Cl. .................................................. B60d 1/06
[50] Field of Search ........................................... 280/492,
511, 515, 461(.1), 460(.1)

[56] References Cited
UNITED STATES PATENTS

| 1,574,461 | 2/1926 | Witsberger .................. | 280/511 |
| --- | --- | --- | --- |
| 2,250,661 | 7/1941 | Thorp ............................ | 280/511X |
| 2,525,505 | 10/1950 | Wiedman ...................... | 280/511X |
| 2,686,684 | 8/1954 | Eberly et al. .................. | 280/515 |

FOREIGN PATENTS

| 83,746 | 5/1954 | Norway ........................ | 280/511 |
| --- | --- | --- | --- |
| 235,369 | 9/1961 | Australia ...................... | 280/515 |
| 1,325,076 | 3/1963 | France ......................... | 280/494 |

Primary Examiner—Leo Friaglia
Attorney—Robert E. Geauque

ABSTRACT: A coupling is disclosed herein for interconnecting a self-propelled or leading vehicle with a trailer or following vehicle which includes a locking bolt interconnected between a pair of bracketed lugs adapted to be attached to a towing vehicle by means of a ball carried on a trailer or following vehicle tongue adapted to be attached to a trailing vehicle. The ball is connected to the bolt at a position between the lugs to permit limited universal relative movement between the trailing and towing vehicles.

Patented Nov. 24, 1970 3,542,400

WYLIE A. MASON, JR.
INVENTOR.

BY R. E. Geauque
ATTORNEY

UNIVERSAL TRAILER COUPLING

BACKGROUND OF THE INVENTION

1. Field of the Invention

This invention relates to universal trailer couplings or hitches and particularly to means for permitting ease of installation with a minimum number of standard parts and to minimizing hitch connection lost motion for impact reduction on trailing vehicles and equipment.

2. Description of the Prior Art

Heretofore, the trailer couplings commonly in use have generally been quite difficult to assemble. In many instances the coupling is of such a complex design, with the assembly procedure so cumbersome, that more than one operator is needed to connect the trailer to the towing vehicle. Another difficulty with such prior couplings is that special tools and loose parts (which may be misplaced) are often required to secure the coupling.

Heretofore, many couplings include a bolt extending through opposite members of a yoke and is secured thereto by a nut. In assembling this device, a pair of tools are required to secure the nut while the bolt head is being rotated. Another difficulty with this coupling is that the bolt and nut are not integrally connected to the yoke and could very easily be misplaced when not in use. Also, there are no locking or retaining means shown to keep the assembly from working itself loose during the towing operation, which could lead to disastrous consequences. In other devices of the prior art there are locking means for securing the members that house the ball. However, no locking means are provided to insure retention of the nuts that secure the bracket and tongue to the locking bolt.

In other complex couplings of the prior art there are many loose parts which are not integrally connected to the main housing members, and as a result could easily become misplaced. The method of assembling these multiple components is quite tedious and cumbersome.

SUMMARY OF THE INVENTION

Accordingly, a coupling for interconnecting vehicles is provided comprising a fixed bracket adapted to be attached to a towing vehicle, having a pair of lugs integrally connected to the bracket with a cylindrical bore extending through each of the lugs. One of the lugs further includes a threaded connection integral therewith for receiving a locking bolt which extends through the cylindrical bores. The coupling further includes a trailer tongue adapted to be attached to a trailing vehicle, having a movable ball positioned between the lugs. The ball includes a diametrical bore for receiving the bolt to permit universal relative movement between the trailing and towing vehicles, thereby fulfilling a primary object of the invention, i.e. providing a universal trailer-coupling comprising a minimum number of simple parts.

It is among the primary objects of the invention to provide a trailer-coupling that can be easily connected and disconnected without utilizing special tools.

Another object of the invention is to provide an improved coupling lock which insures safe interconnection of two vehicles, but which may be conveniently released to permit rapid disconnection.

Still another object of the present invention is to provide a novel trailer hitch or vehicle-coupling adapted to be readily installed by unskilled personnel and having a configuration, which by visual inspection, reveals its manner of operation to such unskilled personnel.

Yet another object resides in providing a novel vehicle-coupling device requiring a minimum degree of technical competence for safe and dependable installation and operation.

A further object pertains to a novel universal trailer-coupling adapted to minimize hitch connection lost motion for impact reduction on trailing vehicles and equipment.

Various other objects and advantages will appear from the following description of one embodiment of the invention, and the novel features will be particularly pointed out hereinafter in connection with the appended claims.

DESCRIPTION OF THE PREFERRED EMBODIMENT

Figure 1:
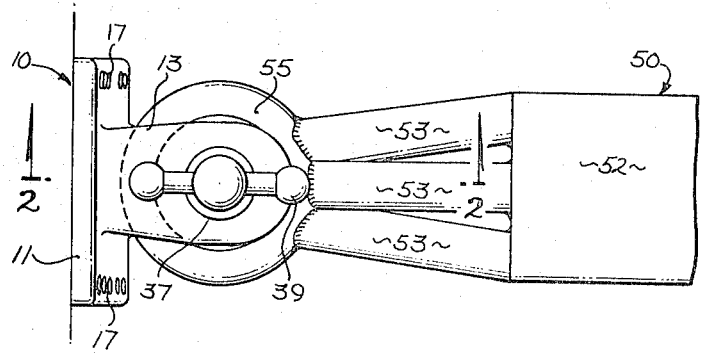
FIG. 1 is a top plan view of a coupling in accordance with the invention.
Figure 2:
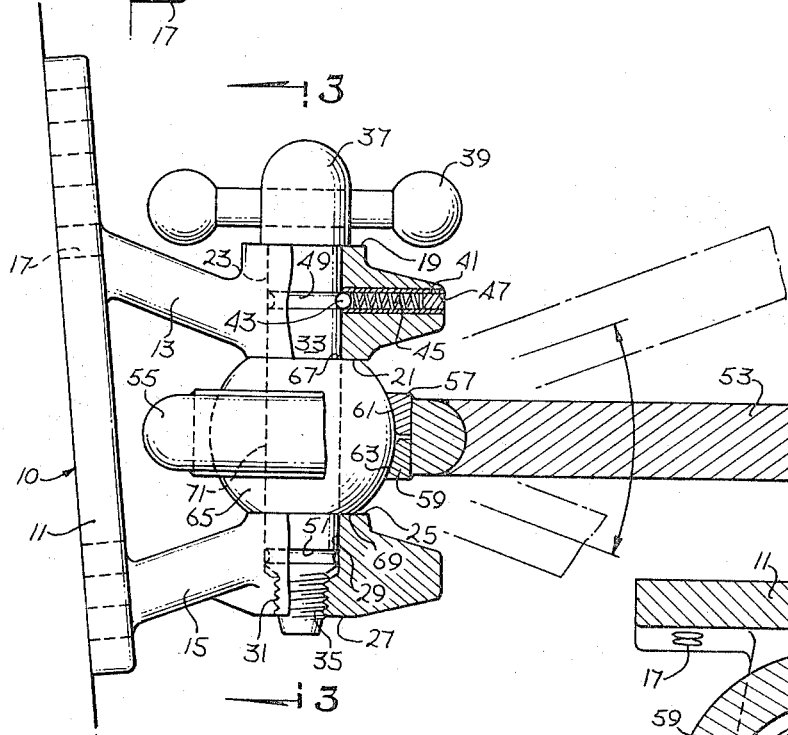
FIG. 2 is a side view, partially in section of the coupling, taken along the line 2-2 of FIG. 1.

In the illustrated embodiment of the invention shown in FIGS. 1 and 2, a bracket, generally indicated at 10, includes a base 11 carrying a pair of lugs 13 and 15. The base 11 further includes a plurality of holes 17 utilized for connection to a towing vehicle, such as an automobile, truck, or leading trailer. The upper lug 13 has an upper face 19 and a lower face 21 interconnected by a cylindrical bore 23 extending through the lug 13. The lower lug 15 also has an upper face 25 and a lower face 27. However, a cylindrical bore 29 extends only partially into the lower lug 15 through the upper face 25. An internally threaded secondary bore 31 extends through the remaining depth of the lower lug 15 extending from the base of the cylindrical bore 29 to the lower face 27. The axes of the cylindrical bores 23 and 29 are coaxial and concentric.

A cylindrical locking bolt 33 is adapted to be inserted into the cylindrical bores 23 and 29, with the lower end having an externally threaded portion 35 for engagement with the secondary bore 31. The upper end of the bolt 33 includes a flanged head portion 37 with the bottom of the flange capable of resting on the upper face 19 of the upper lug 13. A handle 39 is located on the head portion 37.

A bolt lacking means for securing the bolt against any unwarranted longitudinal movement includes a recess 41 extending into the upper lug 13 from the surface of the cylindrical bore 23. A ball detent 43 is yieldably urged in the recess 41 by means of a compression spring 45. The compression spring 45 is backed by a removable plug 47 inserted into the recess 41. An annular groove 49 is located on the cylindrical surface of the bolt 33 to receive the ball detent 43, when the groove 49 registers with the recess 41. The lower end of the bolt 33 also includes an annular groove 51 located on its cylindrical surface to receive the ball detent 43, when the groove 51 registers with the recess 41.

A trailer tongue, generally indicated as 50, includes a body section 52 adapted to be attached to a trailing vehicle in any suitable manner. As shown in FIG. 1, the body section 52 is connected to three bars 53, although any number could be specified. The other ends of the bars 53 are connected to an annular ring 55 in any convenient manner such as by welding.

Figure 3:
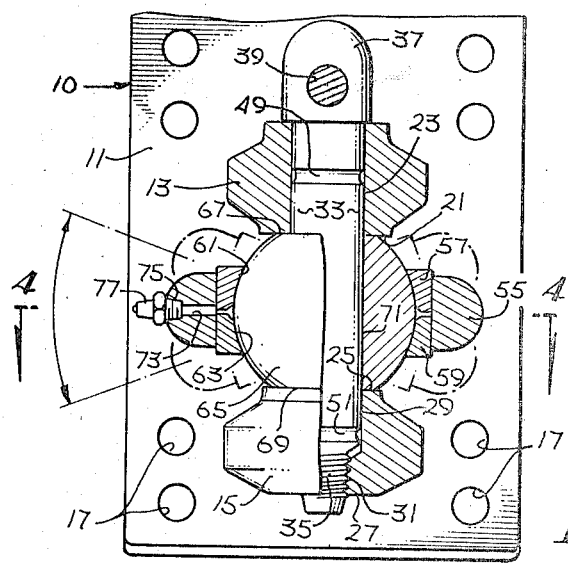
FIG. 3 is a front view, partially in section, of the coupling, taken along the line 3-3 of FIG. 2.

As shown more clearly in FIGS. 2 and 3, a pair of annular seat members 57 and 59 are integrally connected to the internal wall of the annular ring 55, also in any manner such as by welding. The upper member 57 is apertured and the walls of the aperture are shaped to form a downwardly facing concave spherical seat 61, while the lower member 59 is correspondingly apertured and has the walls defining its aperture shaped to form an upwardly facing concave spherical seat 63.

A substantially spherical ball 65 is positioned within the aperture formed by the seat members 57 and 59 with the concave spherical seats 61 and 63, respectively, engaging the ball 65 above and below the line of greatest diameter of the latter. The ball 65 further has a pair of flat faces 67 and 69 to engage the lower face 21 and the upper face 25, respectively, when the ball 65 is inerted between the lugs 13 and 15. A diametrical bore 71 is formed within the ball 65 for receiving the locking bolt 33 when the bore 71 registers with the cylindrical bores 23 and 29.

A small bore 73 extends through the ring 55 and communicates with the concavity formed by the seat members 57 and 59. This bore 73 is provided at the outer end of the ring 55 with a threaded counterbore 75. A grease fitting 77 of known construction is threaded into the counterbore 75 to provide a supply of lubricant to the concavity through the bore 73.

In operation, when it is desired to couple the trailer to the towing vehicle, the locking bolt 33 is positioned so that its lower annular groove 51 registers with the ball detent 43. In this position, the bolt 33 does not interfere with the ball 65 when it is inserted between the lugs 13 and 15. The ball 65, carried by the trailer tongue 50, is then positioned between the lugs 13 and 15 so that the diametrical bore 71 registers with the cylindrical bores 23 and 29. Thereafter, the bolt 33 is released from its upper position and is inserted into the diametrical bore 71 and the cylindrical bore 29. The bolt 33 is then rotated by the handle 39 until its threaded portion 35 is screwed into the secondary bore 31. In this position, the annular groove 49 of the bolt 33 is in registry with the ball detent 43 to prevent any rotation of the bolt 33 during movement of the vehicle thereby keeping the entire coupling secured.

As shown in FIGS. 2 and 3, the trailer tongue 50 has substantially free rotary movement in any direction with respect to its mounting through out a range of 45°, thus enabling the coupled parts unobstructedly to assume any degree of relative angularity within said range. The extreme positions of the bars 53 and ring 55 are shown in broken lines in the FIGS.

Figure 4:
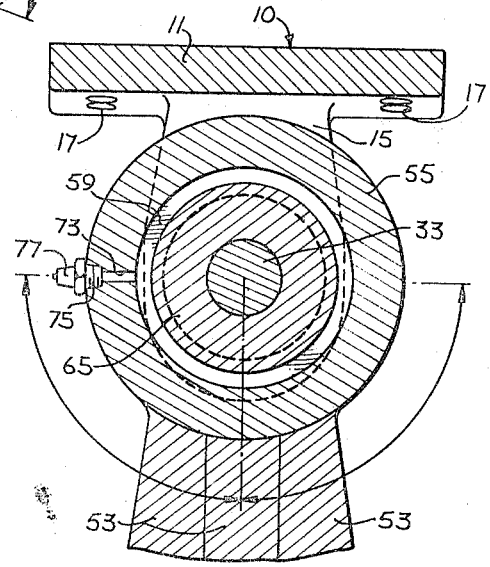
FIG. 4 is a top sectional view of the coupling, taken along the lines 4-4 of FIG. 3.

FIG. 4 shows that the bars 53 may be articulated within a range of 180° to permit the towing vehicle to make right angle turns with respect to the trailer.

As can be seen, no special tools are utilized in connecting or disconnecting the coupling. Furthermore, there are no loose parts involved that can be lost during assembly. The entire connecting operation can easily be executed by a single person. Finally, the coupling is simple in construction, economical to manufacture, safe and dependable, requiring minimum technical competence for dependable operation.

It will be understood that various changes in the details, material, steps and arrangements of parts, which have been herein described and illustrated in order to explain the nature of the invention, may be made by those skilled in the art within the principle and scope of the invention as expressed in the appended claims.

I claim:

1. A coupling comprising:
   a fixed bracket adapted to be connected to a towing vehicle;
   a first and second lug integrally connected to said bracket, said first lug having a cylindrical bore extending therethrough, with said second lug having a cylindrical bore partially extending therethrough, said second lug further having a threaded secondary bore extending therein at the base of said second lug bore;
   a cylindrical locking bolt adapted to extend through said cylindrical bore of said first lug and engage the secondary bore of said second lug;
   a trailer tongue adapted to be inserted between said lugs, said tongue having an opening, said tongue being of a unitary construction and substantially uniform in dimensions throughout its length, a pair of members positioned within said opening and being integrally connected thereto, said members cooperating to form an aperture, the walls defining said aperture being shaped to form a concave spherical seat; and
   a ball of a unitary structure positioned within said aperture engaging said concave spherical seat, said ball having a diametrical bore to receive said cylindrical bolt when said diametrical bore registers with the bores of said lugs, the direction of the towing force from said trailer tongue being in a radial direction with said ball.

2. A coupling comprising:
   a fixed bracket adapted to be connected to a towing vehicle;
   a first and second lug integrally connected to said bracket, said first lug having a cylindrical bore extending therethrough, with said second lug having a cylindrical bore partially extending therethrough, said second lug further having a threaded secondary bore extending therein at the base of said second lug bore;
   a cylindrical locking bolt adapted to extend through and engage the secondary bore of said second lug;
   a trailer tongue adapted to be inserted between said lugs, said tongue having an opening, a pair of members positioned within said opening and being integrally connected thereto, said members cooperating to form an aperture, the walls defining said aperture being shaped to form a concave spherical seat;
   a ball positioned within said aperture engaging said concave spherical seat, and ball further having a diametrical bore to receive said cylindrical bolt when said diametrical bore registers with the bores of said lugs; and
   locking means to prevent axial movement of said cylindrical bolt upon being threadedly engaged to said second lug.

3. The coupling in accordance with claim 2 wherein said locking means includes:
   a recess extending into the cylindrical bore sidewall of said first lug;
   a spring-loaded ball detent positioned within said recess; and
   an annular groove positioned on said cylindrical bolt to register with said ball detent when said cylindrical bolt is threadedly engaged to said second lug.

4. The coupling in accordance with claim 3 wherein said cylindrical bolt further includes a second annular groove adjacent the threaded end thereof to register with said ball detent, retaining said bolt in a position that permits the insertion or withdrawal of said trailer tongue without interference.

5. The coupling in accordance with claim 1 wherein said pair of members comprise:
   a top member having a downwardly facing concave spherical seat forming a portion of the wall defining said aperture;
   a bottom member having an upwardly facing concave spherical seat forming the remaining portion of the wall defining said aperture, said ball respectively engaging the downwardly and upwardly facing seats above and below the line of greatest circumference of said ball.